Oct. 18, 1949.  I. KIRSCH ET AL  2,485,449
WELT-CUTTING MACHINE
Filed Jan. 12, 1948
2 Sheets-Sheet 2
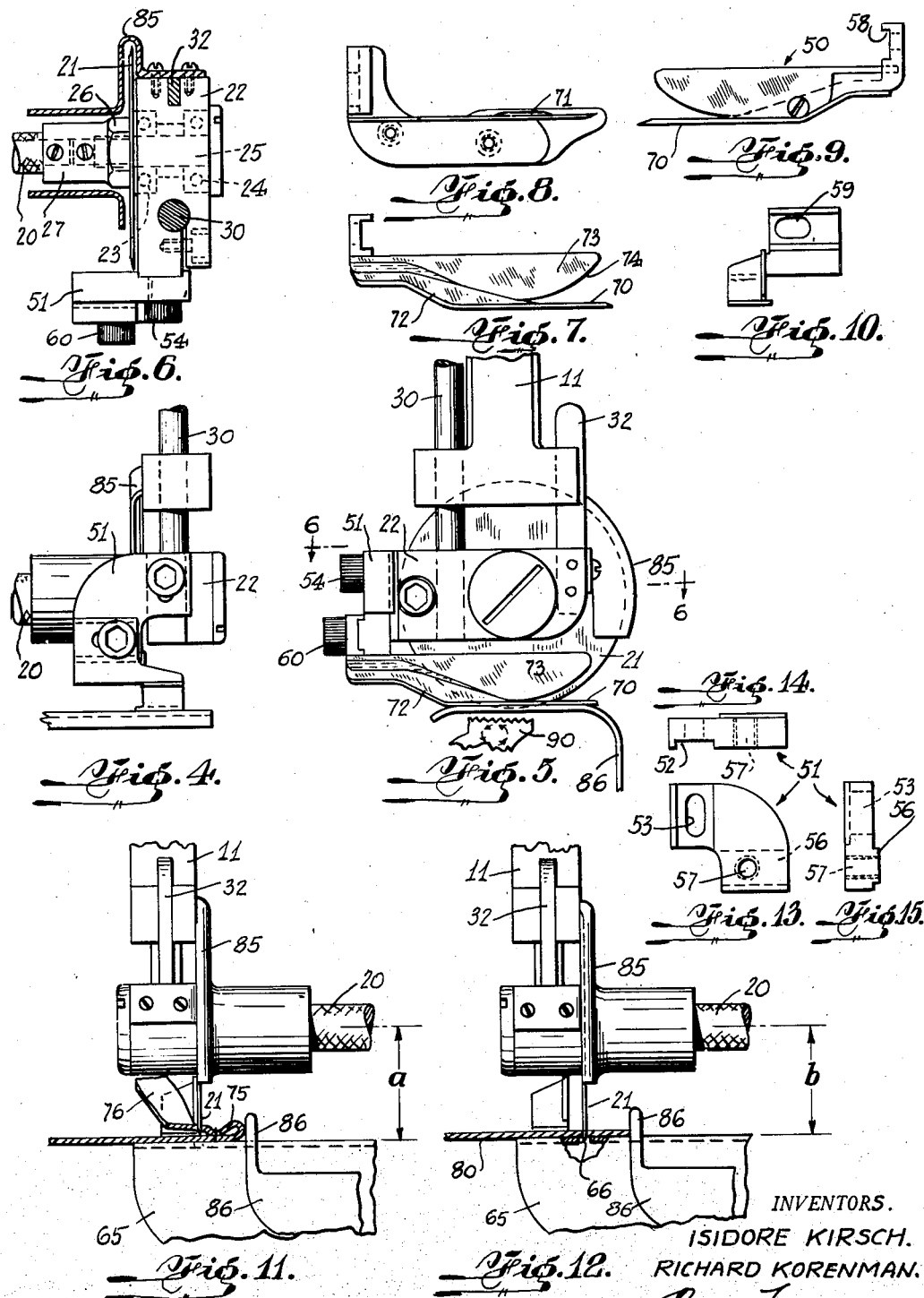
INVENTORS.
ISIDORE KIRSCH.
RICHARD KORENMAN.
BY Percy Freeman
ATTORNEY.

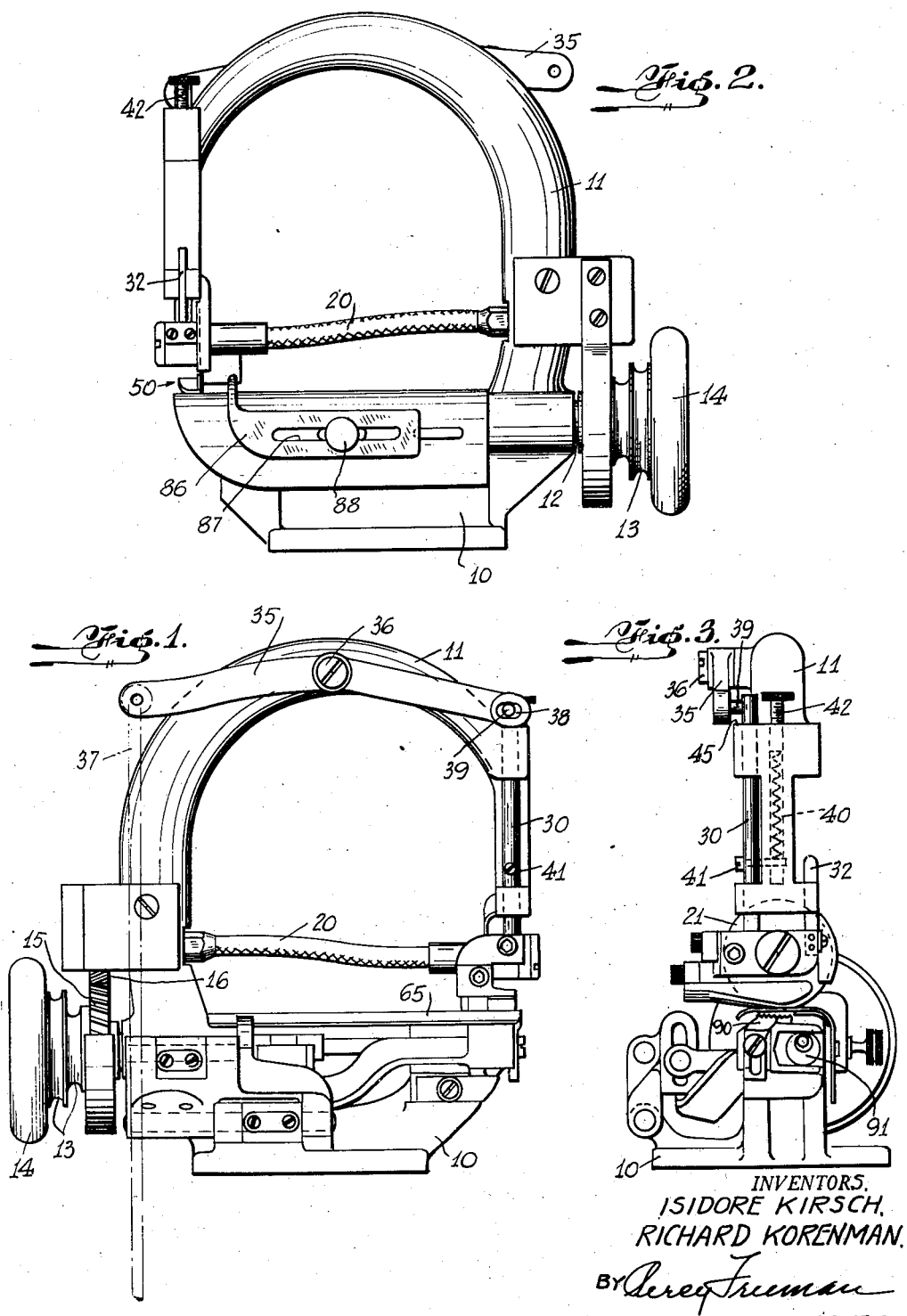

Patented Oct. 18, 1949

2,485,449

UNITED STATES PATENT OFFICE 2,485,449

WELT-CUTTING MACHINE

Isidore Kirsch and Richard Korenman,
Bronx, N. Y.

Application January 12, 1948, Serial No. 1,783

7 Claims. (Cl. 164—60)

1

This invention relates to a welt cutting machine.

In the hat industry, as well as in other industries, welts are used for many different purposes. In the hat industry, for example, a conventional welt consists of a single strip or band of welt material folded over upon itself to form a pair of superimposed layers. It is desirable to trim the surplus of one of these layers, that is, to cut it along a predetermined line adjacent the stitching to provide a smooth, uniform edge. This trimming or cutting operation is now done by hand, and there is no known machine capable of effectively and economically doing the job.

It is accordingly the principal object of this invention to provide a machine of the character described, which is adjustable in cutting depth and which is provided with means enabling it to cut through one of a plurality of superimposed layers.

Another object of this invention is the provision of a machine of the character described, which is capable of cutting strips out of sheet material. The machine herein claimed is not only adapted for cutting through one or more of a greater number of layers of sheet material, but it is also capable of cutting through all of the layers simultaneously. As has already been indicated in the first case, the machine may be used to trim welts; in the second case, it may be used to cut strips, bands, binding, straps, and the like.

Still another object of this invention is the provision of a machine of the character described, which is adapted to cut non-laminated sheet material to a selected predetermined depth. In other words, not only is the machine capable of cutting completely through the material, but it is also capable of cutting only partly through it to any selected depth.

A preferred form of this invention is shown in the accompanying drawing, in which:

Fig. 1 is a back view thereof.

Fig. 2 is a front view thereof.

Fig. 3 is a side or end view thereof.

Fig. 4 is an enlarged fragmentary back view of the presser foot mechanism of the machine.

Fig. 5 is an enlarged fragmentary side view of the presser foot and cutting knife assembly.

Fig. 6 is an enlarged fragmentary horizontal section on the line 6—6 of Fig. 5.

Fig. 7 is a detailed left side view of the presser foot.

Fig. 8 is a plan view of the presser foot.

Fig. 9 is a right side view thereof.

Fig. 10 is a front view thereof.

Fig. 11 is an enlarged fragmentary front view of the presser foot and cutting knife assembly, showing its position during the course of a welt-trimming operation.

Fig. 12 is a view similar to that of Fig. 11, show-

2 ing the device in the position it assumes during the course of a strip-cutting operation.

Fig. 13 is a detailed front view of one of the position-adjusting parts connected to the presser foot.

Fig. 14 is a plan view thereof.

Fig. 15 is a side or end view thereof.

The machine herein claimed has a base 10 which may rest on a table or other support, in the manner of a conventional sewing machine base. It has a head 11 which bears marked resemblance to a conventional sewing machine head. A driving shaft 12 is mounted in the base 10, and connected to said shaft is a plurality of pulleys 13 and a hand wheel 14. The wheel, the pulleys, and the shaft are so affixed to each other that they rotate integrally with each other. Conventional means are provided to prevent axial movement of the shaft and of the pulleys and wheel mounted thereon. These pulleys may be connected to a source of motive power such as an electrical motor by conventional belt means.

Also fixedly mounted on shaft 12 is a gear wheel 15 which meshes with a second gear wheel 16. Connected to gear wheel 16 in the usual manner is a flexible shaft 20 and connected to said shaft in the usual manner is a circular cutting knife or blade 21. Details of the connection between the cutting blade 21 and the flexible shaft 20 are shown in Fig. 6. It will there be noted that a block 22 carries a pair of bearings 23 and 24, respectively, and that supported by said bearings is a stud shaft 25. Mounted on the stud shaft is the cutter 21 previously mentioned. The cutter is fixed in place on stud shaft 25 by means of a nut 26 which engages the cutter on one side and which clamps it against a collar on the other side thereof. A nipple or coupling 27 connects the flexible shaft 20 to the stud shaft 25, and hence, said stud shaft may be driven by the flexible shaft as will hereinafter more fully appear.

The cutter 21 may be caused to rotate by motive power hereinabove referred to, through the facilities of pulleys 13, shaft 12, gear wheels 15 and 16, flexible shaft 20, coupling 27, and stud shaft 25. By reason of the fact that flexible shaft 20 is one of the elements of the causative chain last mentioned, it will be appreciated that the rotary cutter 21 may engage not only in rotary movement but also in lateral or vertical movement as the case may be. More particularly, the rotary cutter 21 may be placed in different positions relative to the base 10 of the machine and its flexible connection with the source of motive power will provide it with all necessary rotary movement, irrespective of its position relative to said base.

It will be noted that a rod 30 is mounted in head 11, extending vertically of the base and movable vertically with respect thereto. Reference to Fig. 6 will disclose the fact that block 22 is clamped to rod 30 so that vertical movement of said rod necessarily affects a corresponding movement of the block. A vertically-extending bar 32 is provided to prevent block 22 from moving in any direction other than the vertical. Hence, when rod 30 is raised or lowered block 22 will also be raised or lowered simultaneously therewith, and since rotary cutter 21 is connected to the block in the manner above indicated, such vertical movement will be reflected by a corresponding vertical movement of said rotary cutter.

To effect such vertical movement of vertically-extending rod 30, an arm 35 is provided, which is pivoted to head 11 on a horizontally-extending pivot 36. At one end, said arm is connected by means of rod 37 to a conventional foot treadle and at its opposite end, it is provided with a slot 38 which engages a pin 39 mounted at the top of rod 30. The foot treadle may be actuated to cause arm 35 to pivot on 36, thereby raising or lowering, as the case may be, rod 30, block 22 connected to said rod, and the rotary cutter 21 connected to said block.

A compression spring 40 is carried within a vertically-extending hole in head 11 parallelling rod 30. At its lower end, the spring engages a horizontally-extending screw or pin 41 which is carried by rod 30. At its upper end, the spring engages an adjusting screw 42 which adjusts the tension of the spring. The engagement of compression spring 40 with screw 41 on rod 30 tends to cause said rod to move in a downward direction, and tends to hold said rod in its lowermost position. And what is said of the influence of spring 40 upon rod 30 is, of course, equally true of its influence upon block 22 and rotary cutter 21 since they move integrally with said rod.

Another element that affects or controls the vertical movement of rod 30 is pin 39. It will be noted in Fig. 3, that pin 39 is positioned for engagement with shoulder 45 on head 11. More specifically, pin 39 serves as a stop member which limits the downward movement of rod 30 and of the block 22 and rotary cutter 21 which are connected to said rod. The downward movement of rod 30 ceases when pin 39 engages shoulder 45. It will hereinafter become apparent that this limitation upon the downward movement of rod 30 prevents downward movement of the rotary cutter 21 beyond a predetermined point.

There are other means of controlling the movement, other than rotary, of cutting member 21. Referring now to Figs. 7 to 10, inclusive, and 13 to 15, inclusive, it will be noted that a presser foot 50 and an adjustable support or bracket therefor 51, are provided. Bracket 51 is shown in Figs. 4, 5, and 6, to be adjustably-mounted on block 22. Bracket 51 has a vertically-extending channel 52 formed in one face thereof, and a vertically-extending slot 53 formed in said channel. It will be seen in Fig. 6 that channel 52 receives a complementarily-shaped portion of block 22 and that relative vertical movement between bracket 51 and block 22 is thereby provided for. A clamping screw 54 engages block 22 through slot 53 of bracket 51 and said clamping member may be used to lock the bracket in any desired position relative to block 22. To adjust the position of bracket 51 relative to said block, clamping member 54 is caused to release bracket 51. Said bracket is then moved to any desired position vertical of block 22, and the clamping member is caused to re-engage the bracket 51 and clamp it against block 22.

Bracket 51 is also provided with a horizontally-extending raised portion or ridge 56 and with a tapped hole 57 formed in said ridge transversely thereof. Presser foot 50 has a horizontally-extending channel 58 corresponding to channel 52 and adapted to engage raised portion 56 in the manner shown in Fig. 5. A horizontally-extending slot 59 is formed in channel 58 of the presser foot and a second clamping screw 60 is provided, which engages tapped hole 57 in the bracket through slot 59 in the presser foot. By this means, horizontal adjustment of the presser foot relative to the bracket, may be had. The manner in which the presser foot and the bracket on which it is mounted may be used to limit the downward movement of the rotary cutter 21 will now become apparent. When the presser foot is fixed in place on the bracket and the bracket is fixed in place on block 22, downward movement of said block and of the rotary cutter which is connected thereto, will cease when the presser foot engages the table 65 of base 10. If it is desired to have the rotary cutter descend still farther, bracket 51 should be raised with respect to block 22 and clamped in its raised position on said block. Should it be desired to reduce the extent of the downward movement of the rotary cutter, then bracket 51 should be brought to a lower position on block 22 and in that lower position, it should be clamped tight on said block by the clamping screw means above described.

Fig. 11 shows the position of the rotary cutter when its downward movement is limited to a rather high level, and Fig. 12 shows its position when its downward movement is permitted to reach a relatively low level. In Fig. 11, the rotary cutter is shown to be spaced from the top surface of table 65, whereas in Fig. 12 the cutting member is shown to go below the table surface and to enter a slot 66 formed therein. In the first case, the machine may be used for trimming welts and in similar operations; in the second case, it may be used for cutting strips of binding and other material. In this connection, reference should be made to lines a and b of Figs. 11 and 12, and it will therein be noted that line a is somewhat longer than line b.

The construction of presser foot 50 is of great importance. It has a horizontally-extending base plate or spacer 70 which has a slot 71 formed therein to accommodate rotary cutter 21. Plate 70 has an upwardly and downwardly sloping portion 72, and extending above said plate and adjacent said sloped portion 72 is a vertically-disposed presser foot proper 73. It will be noted, especially in Fig. 7, that presser foot 73 has a downwardly and backwardly extending slope or edge 74. And it will be understood that it is this edge which engages the work and urges it downwardly into operative position on table 65. When the machine is used for trimming welts, such as welt 75, as shown in Fig. 11, plate 70 is introduced into the space between the two welt layers. It has above been stated that the presser foot may be used to limit the downward movement of the rotary cutter 21 and in the case shown in Fig. 11, the rotary cutter is prevented from moving below the level of spacer plate 70. Since this plate is shown in Fig. 11 to rest on the lower of the two welt layers, it is clear that the rotary cutter will thereby be prevented from reaching and cutting said lower welt layer. By the same token the rotary cutter is permitted to enter slot 71 in spacer plate 70 and it is thereby enabled to cut through the upper of the two felt layers. To facilitate this last-described operation, spacer plate 70 tends to raise the upper welt layer until it is brought into spaced relation to the lower welt layer. The sloping portion 72 engages the surplus portion 76 of welt 75 and wedges it out of the way of the rotary cutter continuously with the cutting operation.

It should be stated here that conventional means may be used to move the work into and out of operative position relative to the cutting element 21. These means are best shown in Figs. 3 and 5. A conventional feeder 90 is provided, which moves in the direction of the curved arrows shown in Fig. 5. This feeder is actuated by cam mechanism 91 shown in Fig. 3, and by other conventional mechanism also therein shown.

When it is desired to cut material 80 into strips, as shown in Fig. 12, presser foot 50 is moved away from rotary cutter 21 and said cutter is caused to enter slot 66 of table 65. Since the rotary cutter is thereby brought below the surface level of table 65, it is clear that material 80 will be cut completely through as shown in Fig. 12.

It will be understood from the foregoing that a machine completely new to the art has herein been described. It may be modified in many ways within the broad scope of the invention, and its range of equivalents is extremely broad. For example, the specific means by which the presser foot 50 may be adjustably positioned, both horizontally and vertically, may assume other forms than that shown in the drawing. Means other than a flexible shaft may be used to drive the rotary cutter, but whatever means are used, flexibility should be the keynote. In other words, the driving means should not prevent upward and downward movement of the cutting element. It should be clearly understood, however, that although the drawing shows a fixed table and a vertically-movable cutting element and presser foot, the cutting element may be held in fixed position and the table rendered vertically adjustable with respect thereto, but whether the table is adjustably positionable relative to the cutting element or the cutting element relative to the table, the presser foot should preferably be positionable adjustably as to both the cutting element and the table. Other constructional variations are also herein contemplated.

Refinement are also contemplated as being within the scope of this invention. For example, the cutting element 21 may be provided with a guard 85 to lessen the danger of injury to the person operating the machine. A stop or gauge member 86 may be provided to guide the welt 75 or material 80 during the cutting operation. This gauge should preferably be adjustably positionable relative to base 10, and in Fig. 2 means is shown whereby this can be accomplished. The gauge 86 is provided with a horizontally-extending slot 87, and a clamp screw 88 engages base 10 through said slot. It is by means of this clamp screw and slot construction that gauge 86 may be clamped in any desired position on base 10.

Having thus described our invention, what we claim as new and desire to secure by Letters Patent, is:

1. A welt-cutting machine comprising a base which supports the welt, a rotary cutter which is adjustably positionable on said base to engage the surplus material of the welt for the cutting operation, a feeder in said base which feeds the welt to the rotary cutter during the cutting operation, and a presser foot which holds the material in operative position for the cutting operation, said presser foot being provided with a spacer which engages the welt between its layers, and spaces the layers, bringing the upper layer into operative contact with the rotary cutter and holding the lower layer out of contact with the rotary cutter.

2. A welt-cutting machine comprising a base which supports the welt, a head on said base, a rotary cutter carried by said head and vertically adjustable in respect thereto, clamping means for fixedly positioning said rotary cutter on said head relative to said base, a feeder in said base which feeds the welt to the rotary cutter for the cutting operation, a presser foot also mounted on said head for holding the welt in operative position relative to the rotary cutter, said presser foot being positionally adjustable both with respect to the rotary cutter and to the base, said presser foot, when fixedly positioned relative to the rotary cutter, being engageable with the welt-carrying base and serving as a stop gauge for the rotary cutter, preventing its downward movement beyond a predetermined point.

3. A machine for cutting multi-layered welts, said machine comprising a base which carries the welt, a head on said base, a vertically moving support on said base, a rotary cutter carried by said support, said support being adjustably positionable on said head to adjust the position of said rotary cutter relative to the welt-carrying base, a feeder in said base which feeds the welt into operative engagement with the rotary cutter, and a presser foot adjustably connected to the vertically movable support, said presser foot being positioned to engage the welt-carrying base to limit the downward movement of the support to which it is connected and of the rotary cutter which is mounted on said support, and to hold the welt in operative position for the cutting operation.

4. A welt-cutting machine in accordance with claim 3, in which the rotary cutter is connected to a flexible driving shaft which causes it to rotate irrespective of its position relative to the welt-carrying base.

5. A welt-cutting machine in accordance with claim 3, in which the presser foot is provided with a horizontally-extending spacer which engages the welt between its layers, and spaces the upper layer from the lower layer, thereby bringing the upper layer into cutting engagement with the rotary cutter and holding the lower layer out of such engagement with the rotary cutter.

6. A welt-cutting machine in accordance with claim 3, in which the presser foot is adjustably positionable both vertically and laterally of the rotary cutter.

7. In a machine of the character described, a presser foot comprising a pressing element which engages the welt and holds it down for the cutting operation, and a spacing element which engages the welt between its layers and thereby spaces the upper layer from the lower one, whereby the upper layer is held in position for engagement with the cutting member and the lower layer is held out of engagement therewith.

ISIDORE KIRSCH.
RICHARD KORENMAN.

REFERENCES CITED

The following references are of record in the file of this patent:

UNITED STATES PATENTS

| Number | Name | Date |
| --- | --- | --- |
| 2,142,079 | Weis | Dec. 27, 1938 |